United States Patent [19]

Leiber

[11] 4,349,079
[45] Sep. 14, 1982

[54] POWER STEERING FOR MOTOR VEHICLES

[75] Inventor: Heinz Leiber, Leimen, Fed. Rep. of Germany

[73] Assignee: Robert Bosch GmbH, Stuttgart, Fed. Rep. of Germany

[21] Appl. No.: 95,877

[22] Filed: Nov. 20, 1979

[30] Foreign Application Priority Data

Aug. 1, 1979 [DE] Fed. Rep. of Germany ........ 2900510

[51] Int. Cl.³ .................................................. B62D 5/06
[52] U.S. Cl. ................................... 180/143; 180/132; 280/89
[58] Field of Search ................... 280/773, 89, 90, 672; 180/79.1, 132, 141, 142, 143, 154, 159, 158, 160, 161, 162

[56] References Cited

U.S. PATENT DOCUMENTS 2,865,462 12/1958 Milliken et al. ..................... 180/143
2,957,535 10/1960 Helgeson ............................. 180/143
3,426,863 2/1969 Hanson ................................ 180/79.1

Primary Examiner—Joseph F. Peters, Jr.
Assistant Examiner—Randall A. Schrecengost
Attorney, Agent, or Firm—Edwin E. Greigg

[57] ABSTRACT

Power steering system for motor vehicles is proposed, in particular intended for the lower velocity range, which includes a measurement transducer for the steering direction in close relationship with a piston-cylinder unit, which acts simultaneously as the steering damper and as the auxiliary-force apparatus. The measurement transducer may also be integrated in the piston of this unit. The control of the hydraulic medium for the piston-cylinder unit takes place preferably via three-position valves due to desired throttling, in accordance with velocity, of the return flow at a particular time.

12 Claims, 4 Drawing Figures

POWER STEERING FOR MOTOR VEHICLES

CROSS-REFERENCE TO COPENDING RELATED APPLICATIONS AND RELATED PRIOR ART

There are no patents or printed publications having a bearing on the patentability of the present invention, but of interest are the following:

| U.S. Applications of: | Filed | Serial No. |
|---|---|---|
| Heinz Leiber | July 20, 1979 | 59,354 (Group 316) |
| Heinz Leiber | July 20, 1979 | 59,355 (Group 316) |
| Heinz Leiber (now abandoned in favor of) | August 17, 1976 | 67,642 |
| Heinz Leiber | October 27, 1980 | 201,095 (Group 316) |

None of these above references, whether taken and viewed singly or in combination with each other, are believed to have a bearing on the patentability of any claim of this invention.

BACKGROUND OF THE INVENTION

The invention relates to a power steering means in which a steering damper or other resilient movement absorbent member is utilized with spaced switching contacts to conduct responsive signals and which are provided as input signals to an electronic control device. A known steering apparatus utilizes the piston-cylinder unit of a steering damper as an instrument for generating the auxiliary force, in order to embody the steering process in such a manner as to require less exertion of force. The control of the modified steering damper is provided by a final control element triggered by an electronic control device which processes rotary directional signals from the steering column. The measurement transducer required for this purpose is located between the steering shaft and the steering gear.

It has now been demonstrated that these measurement transducers are too expensive and not sufficiently amenable to servicing; furthermore, when work must be done on these transducers, direct intervention must be made into the steering mechanism, which is not desirable for safety reasons.

OBJECTS AND SUMMARY OF THE INVENTION

The steering apparatus for motor vehicles as described herein and finally claimed has the advantage over the prior art in that, first, the measurement transducer can be structured more simply and cost favorably because it does not need to pick up rotary motion but instead picks up only linear motion, and, second, the measurement transducer is no longer directly coupled with the steering mechanism, so that the safety risk involved in working on this measurement transducer is reduced to a minimum.

As a result of the features disclosed in the dependent claims, advantageous further embodiments and improvements of the steering disclosed in the main claim are possible. It has proved to be particularly advantageous that it is possible to integrate the measurement transducer with the piston-cylinder unit of the steering damper. Furthermore, the measurement transducer can be realized particularly simply, for instance by using a leaf spring and placing fixed contacts spaced a predetermined distance apart on either side.

The invention will be better understood and further objects and advantages thereof become more apparent from the ensuing detailed description of preferred embodiments taken in conjunction with the drawings.

DESCRIPTION OF THE PREFERRED EMBODIMENTS

Figure 1:
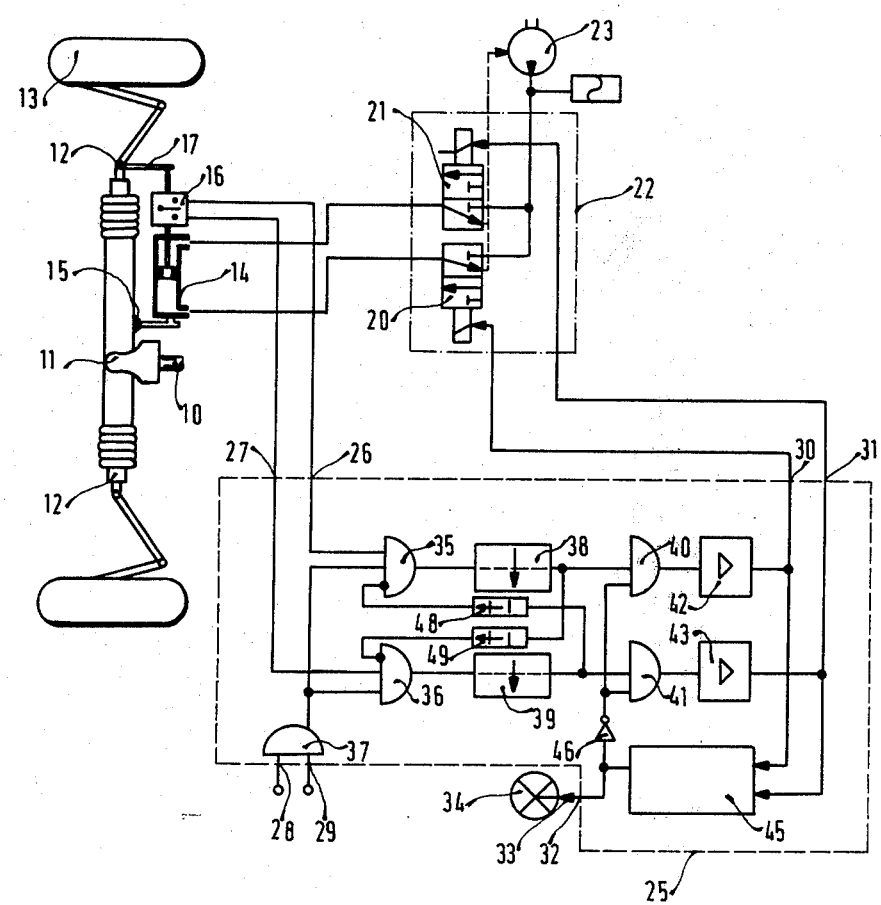
FIG. 1 is a schematic representation of the steering mechanism in combination with the block diagram of the control of the power steering.

Referring now to the drawings, FIG. 1 shows schematically the front axle of a motor vehicle with the steering mechanism and the various structural elements and control apparatuses which provide the power steering. Reference numeral 10 designates a steering shaft and 11 designates a steering gear which, in a manner not shown in further detail, acts upon a steering tie rod joint 12 in order to control the running direction of a wheel 13. Reference numeral 14 is the piston-cylinder unit of a steering damper which includes damper or shock absorbing movements and a movement sensitive measurement transducer 16, which in the controlled embodiment now serves the purpose of the power-assist apparatus. While the cylinder of the piston-cylinder unit 14 is firmly connected to the vehicle axle via a corresponding securing means 15, the piston is coupled via the measurement transducer 16 and a lever 17 with the steering tie rod joint 12.

The piston-cylinder unit 14 receives its hydraulic control fluid, via two electrically controllable magnetic valves 20 and 21 in a final control element 22, from a container 23 for pressure fluid, which is also usable as part of the central hydraulic system in combination with an anti-locking system.

An electronic control device 25 receives steering directional signals via two inputs 26 and 27, an ignition signal via an input 28 and a velocity threshold signal via an input 29. Two outputs 30 and 31 are connected to the energizer coils of the two magnetic valves 20 and 21 in the final control element 22 and a line 33 leads from a further output 32 to a warning light 34, which is intended to indicate disturbances.

The control device 25 contains linkage elements for the various electrical signals as well as output signal booster stages and a safety circuit for the purpose of recognizing, indicating, and reacting to disturbances. The result, in detail, is the following structure. The two inputs 26 and 27 are each carried to one logic gate 35 and 36 each having one inverting input and two non-inverting inputs, with these inputs 26 and 27 being connected with the non-inverting inputs of the two logic gates. The further non-inverting input of each logic gate 35 and 36 is connected with the output of an AND gate 37, the inputs of which are identical with the inputs 28 and 29 for the ignition signal and the velocity threshold signal.

On the output side, each gate 35 and 36 is followed by a timing circuit 38 and 39, which upon receiving a trigger signal produces an output signal of constant pulse duration. Subsequent to each of the two timing circuits 38 and 39 is an AND gate 40 and 41, which are followed in turn by driver stages 42 and 43 before the energizer coils of the magnetic valves in the final control element 22. The outputs of the two driver stages 42 and 43 are additionally carried to a safety circuit 45. Its output in turn is connected both with the warning light 34 and, via an inverter 46, with the two further inputs of the AND gates 40 and 41.

Finally, the outputs of the two timing circuits 38 and 39 are also connected, each via one timing circuit 48 and 49, with the inverting input of the particular one of the logic gates 35 and 36 which precedes a particular one of the timing circuits 38 or 39.

The mode of operation of the subject of FIG. 1 is as follows. Upon rotation of the steering wheel (that is, of the steering shaft 10) toward the right, the measurement transducer 16 furnishes an appropriate signal to the input 26 of the control device 25. This signal is switched further via the logic gate 35 onto the timing circuit 38, which is embodied as a monostable multivibrator, whose output signal in turn proceeds via the AND gate 40 to the driver or output stage 42. As a result of this, the magnetic valve 20 is triggered and the piston of the piston-cylinder unit 14 is displaced accordingly. The magnetic valve 20 directs pressure into the cylinder of the unit 14 until such time as the timing circuit 38 again shuts off. An appropriately large pressure surge of the unit 14 causes the response of the contact located opposite it in the measurement transducer 16. Now, in order to prevent the second magnetic valve 21 in the final control element 22 from being triggered thereby, the timing circuit 49 is set by the output signal of the timing circuit 38, which blocks the gate 36 for a corresponding period of time.

In order that the steering power-assist according to the subject of FIG. 1 will function only in the lower velocity range and only when the ignition is switched on, the two input gates 35 and 36 are also dependent on the position of the ignition switch and are controllable by the appearance of a particular lower velocity threshold.

The safety circuit 45 serves the purpose of monitoring the trigger signals of the two magnetic valves 20 and 21 in the final control element 22, because for safety reasons the two magnetic valves must be neither energized individually for too long a time nor energized together at the same time. For this reason, the safety circuit 45 contains timing circuits and preferably an exclusive-OR-gate, so that in case of disturbance an appropriate warning signal can be given with the warning light 34 and simultaneously the driver stages 42 and 43 can be turned off.

Figure 2A:
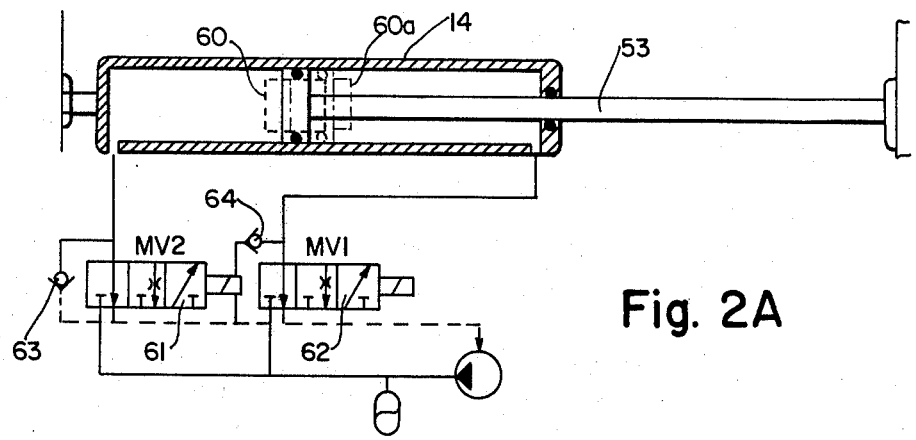
FIG. 2 and FIG. 2A show the disposition of the adjustment cylinder and measurement transducer each in separate embodiments.
Figure 2:
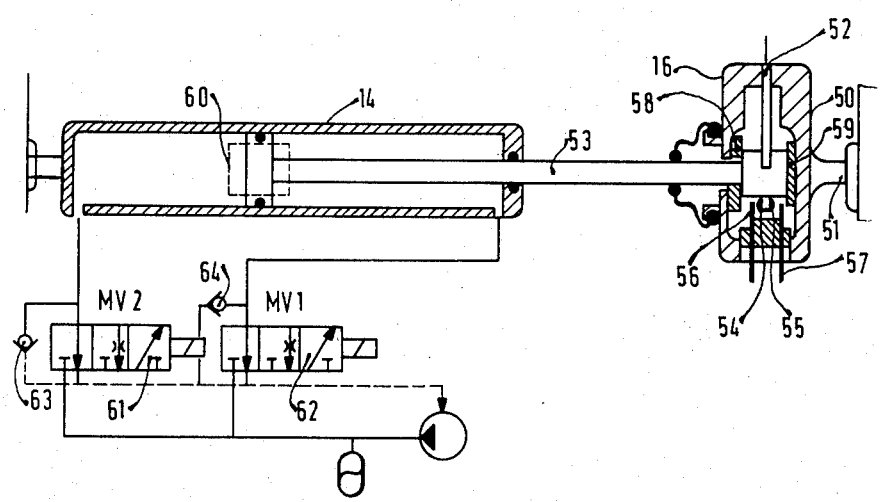

In greater detail than the representation of FIG. 1, FIG. 2 and FIG. 2A show the measurement transducer in combination with the piston-cylinder unit 14. The measurement transducer 16 is connected here by means of one housing end 50 with the steering rod 51. A leaf spring 52 is inserted into the housing 50 itself and coupled in a force-locking manner, insulated if necessary, with the shaft of the piston 53 of the piston-cylinder unit 14. On the other side from where the leaf spring 52 is placed there are two switching contacts 54 and 55, which, depending upon the force and direction of force exertion on the part of the steering rod 51, touch fixed contacts 56 and 57 and thus produce the desired signal. Because a correspondingly large switching path affects the damping properties of the steering damper, which is combined in this exemplary embodiment with the adjustment cylinder of the power-assist apparatus, path-limiting discs 58 and 59 are placed as dampers in the housing 50 of the measurement transducer 16. The travel or path-limiting discs 58 and 59 serving as dampers are made, for example, of yielding, rubber-like material or an elastomeric material. As a result when there is a selected directional movement of the piston 53, one of the contacts 54,55 comes into contact with one of the fixed contacts 56,57. If this be the case, then electrical trigger pulses are prepared in the electrical portion of the system for coupling to the magnetic valves 61 and 62, and the piston 53 is displaced still further in the appropriate left or right and desired direction. This movement is transmitted, via the travel-limiting discs 58 and 59 embodied as dampers, onto the housing of the measuring transducer 16, or onto the housing 60 referred to below, and further onto the steering rod 51, so that the desired power steering comes into effect. If a brief stationary state occurs in consequence of the clocked operation, then the travel-limiting discs 58 and 59 embodied as dampers again effect a central position on the part of the leaf spring 52 and thus effect a contact-free status on the part of the contacts 54–57.

The piston of the adjustment cylinder, here referred to as the piston-cylinder unit 14, has a rectangle 60 indicated in FIG. 2 by broken lines. This rectangle is intended to indicate that the measurement transducer can also be integrated with the piston, which has particular advantages with respect to friction losses and to the reliable functioning of the measurement transducer.

In FIG. 2, again in contrast to the magnetic valves 20 and 21 of FIG. 1, three-position valves 61 and 62 are shown. Parallel to each valve is a check valve, 63 and 64 respectively, which fulfills the role of the so-called main or bottom valve in the steering damper. The valves 63, 64 are designated as check valves, which pertinently describes their function. In conventional steering dampers, there are known in the art so-called bottom valves, which achieve the same purpose and function. By means of this valve, upon an intake movement of the piston of the piston-cylinder unit 14, the appropriate left or right chamber of the cylinder unit 14 is expanded by displacement of the piston which chamber then is refilled with fluid.

The function of the valves 63, 64 is the refilling of fluid when the power steering is not in effect and the magnetic valves 61 and 62 are not excited such as during a steering movement in which the piston of unit 14 is displaced into a left or right cylinder chamber as it is increasing in size. The illustrated, non-excited position of the 3/3-way magnetic valve is unsuitable for this purpose, because it has an excessive throttling effect.

"Appropriate chamber", referred to above, thus designates the particular chamber of the unit 14 which needs to be refilled. If the piston 60 moves to the left, then the right-hand cylinder chamber of unit 14 must be refilled. Correspondingly, it is the left-hand cylinder chamber which must be refilled when the piston 53 moves to the right.

The schematic shows the function of the valves 63 and 64, but in the schematic there is no separate supply container for pressure fluid shown in the hydraulic line indicated by the broken lines. Naturally it is necessary to assure that the pressure medium must be capable of flowing from this return flow line into the partial cylinder chamber which is enlarging in size so as to refill it.

FIG. 2A shows the housing transducer or housing 60 of the enclosed transducer displaced to position 60a shown in phantom lines.

Figure 3:
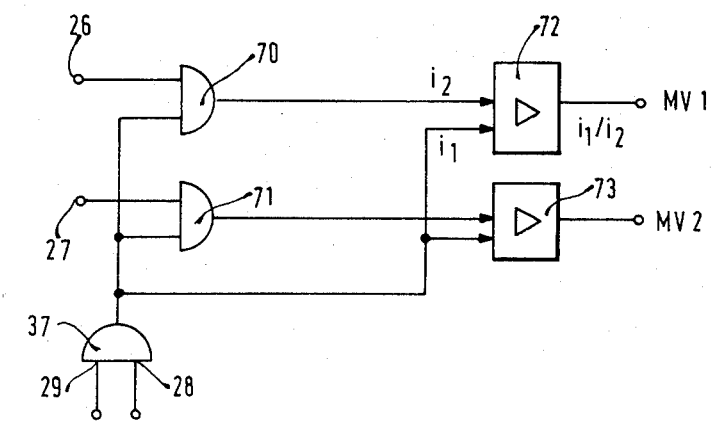
FIG. 3 shows a detail of the control device of the subject of FIG. 1.

FIG. 3 shows several gate functions in combination with an output stage for magnetic valves which is capable of driving the particular magnetic valve with two different flow levels. In the subject of FIG. 3, the same reference numerals are given to signal inputs and structural elements which are identical to those already discussed in connection with FIG. 1.

Each of the inputs 26 and 27 of the control device leads to one of the AND gates 70 and 71, which are each followed in turn by one controllable amplifier 72 and 73. Attached to the outputs of these amplifiers are the energizer coils of the magnetic valves 61 and 62 of FIG. 2. Both the AND gates 70 and 71 and the amplifiers 72 and 73 are supplied with the output signal of the AND gate 37 for the ignition signal and the velocity signal which is already present in the subject of FIG. 1.

If the ignition is switched on and the vehicle is within the velocity range in which the parking power steering is intended to function, then the magnetic valves are switched into the position II (see FIG. 2) by being driven with the flow level $i_1$. If the signal is furnished by means of the measurement transducer 16, then the signal is present at the gates 70 and 71 and switches the amplifiers 72 and 73 onto the flow level $i_2$, which causes a reversal of the particular magnetic valve 61 or 62 into position III. Here, as well, it is necessary for the functioning of the parking power steering that a measurement signal for a switched-on ignition and for low velocity be present at the AND gate 37.

The amplifiers 72 and 73 of FIG. 3 are capable of exciting the magnetic valves 61 and 62 with different electric currents. The steering assist is intended to be effective only in the range of low vehicle speeds.

Whenever the ignition is switched ON and a specific low vehicle speed has not been exceeded, the amplifiers 72, 73 are excited with the current $i_1$, so that the magnetic valves 61, 62 assume their position II (permitting passage, corresponding to the middle symbol of the magnetic valves). A withdrawal of fluid out of one of the cylinders of unit 14 can be effected only in a throttled manner, which is necessary for dynamic reasons when amplified operation is taking place and in order to stabilize the piston 60 when fluid is being supplied out of the reservoir via one of the valves 62, 63.

As soon as the signal for steering amplification arrives from the measuring transducer 16, the gate 70 or 71 is triggered, and the current $i_2$ is established in the amplifier 72 or 73. One of the two valves 61 or 62 then assumes its position 3 (right-hand symbol) so that the appropriate cylinder chamber 14 is made to communicate with the reservoir following the pump.

As for the measuring transducer itself, in the drawing there is schematically shown only a transducer having purely mechanical contacts. In transducer 16 or housing 60 there may be used either a Hall effect or a piezoelectric transducer or transducers as are well known in the art, and these different transducer types simply have by their manufacture the corresponding contact elements replaced by the differently embodied elements of the mechanical or of the Hall effect and piezoelectric transducer.

Preferably, the switching variants with the three-position valves will be used when, in a low velocity range, as the functional range of the parking power steering, greater throttling of the compensatory movement of the fluid of the steering damper is desired than is normally the case. Thus, even at a low adjustment speed on the part of the piston of the piston-cylinder unit 14, relatively high damping forces are brought about.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. Power steering system for motor vehicles comprising
   a steering column,
   a steering gear coupled to said steering column,
   a tie rod coupled to said steering gear for transmitting transverse motion introduced by said steering column and said steering gear to direct the running direction of at least one of said motor vehicle wheels,
   a hydraulic steering damper means including a two-chamber piston-cylinder unit rigidly connected to a vehicle axle and including a piston therein for providing power assist to said steering system and a measurement transducer,
   said measurement transducer being coupled to one end of said piston for relative movement and rigidly connected to said steering rod of said steering system for determining relative movement of said piston,
   a final control element for controlling movement of said piston in said two-chamber piston-cylinder,
   said two-chamber piston-cylinder unit being connected via hydraulic lines to said final control element of said system for controlled movement of said piston, and
   a control device electrically connected to said measurement transducer and triggered by an output of said measurement transducer to supply control pulses to said final control element.

2. Power steering system for motor vehicles in accordance with claim 1, further wherein said measurement transducer is integrated into said piston-cylinder unit.

3. Power steering system for motor vehicles in accordance with claim 1, wherein said piston-cylinder unit includes throttlable means for return flow from said piston-cylinder which may be selectively throttled and processed at low velocity values of said motor vehicles.

4. Power steering system in accordance with claim 3, further wherein said throttlable means for said return flow is controlled by three-position valves.

5. Power steering system in accordance with claim 1, further wherein said measurement transducer contains a double-contact switch.

6. Power steering system in accordance with claim 1, further wherein said measurement transducer is a Hall effect transducer.

7. Power steering system in accordance with claim 1, further wherein said measurement transducer is a piezo transducer.

8. Power steering system in accordance with claim 5, further wherein said double-contact switch contains a leaf spring provided with plural contact elements.

9. Power steering system in accordance with claim 1, further wherein said measurement transducer includes output lines that are connected to timing circuits for control of a safety circuit means.

10. Power steering system in accordance with claim 9, further wherein said timing circuits are reciprocally blockable by delay timing circuit means.

11. Power steering system in accordance with claim 1, further wherein said piston-cylinder unit responds to a pressure medium which is controllable in accordance with an ignition switch position and with a velocity signal.

12. Power steering system in accordance with claim 1, further wherein said control device includes magnetic valves provided with energizer coils respond to output signals from driver stages in said control device, said output signals further being supplied to a safety circuit.

* * * * *